US012711946B2

United States Patent
(12) United States Patent
Amores et al.

(10) Patent No.: US 12,711,946 B2
(45) **Date of Patent: *Aug. 18, 2026**

(54) SPEECH MODEL PERSONALIZATION VIA AMBIENT CONTEXT HARVESTING

(71) Applicant: Intel Corporation, Santa Clara, CA (US)

(72) Inventors: Gabriel Amores, Seville (ES); Guillermo Perez, Seville (ES); Moshe Wasserblat, Maccabim (IL); Michael Deisher, Hillsboro, OR (US); Loic Dufrensne de Virel, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/447,846

(22) Filed: Aug. 10, 2023

(65) Prior Publication Data

US 2024/0038218 A1 Feb. 1, 2024

Related U.S. Application Data

(63) Continuation of application No. 16/650,161, filed as application No. PCT/IB2017/057133 on Nov. 15, 2017, now Pat. No. 11,776,530.

(51) Int. Cl.
*G10L 15/06* (2013.01)
*G10L 15/065* (2013.01)
(Continued)

(52) U.S. Cl.
CPC .......... *G10L 15/063* (2013.01); *G10L 15/065* (2013.01); *G10L 15/075* (2013.01);
(Continued)

(58) Field of Classification Search
CPC .................. G10L 15/063; G10L 15/06; G10L 2015/0638; G10L 2015/0636;
(Continued)

(56) References Cited

U.S. PATENT DOCUMENTS 6,374,221 B1 * 4/2002 Haimi-Cohen ....... G10L 15/063 704/256.1
7,050,974 B1 * 5/2006 Komori ................ G10L 15/065 704/E15.047

(Continued)

FOREIGN PATENT DOCUMENTS

| | | | |
|---|---|---|---|
| CN | 1535460 | A | 10/2004 |
| CN | 103190140 | A | 7/2013 |
| CN | 105320726 | A | 2/2016 |

OTHER PUBLICATIONS

The State Intellectual Property Office of the People's Republic of China, "Notice of grant of patent right for invention," issued in connection with Application No. 201780095381.8, dated Dec. 29, 2024, 7 Pages. [English Translation Included].

(Continued)

*Primary Examiner* — Samuel G Neway
(74) *Attorney, Agent, or Firm* — Akona IP PC

(57) ABSTRACT

An apparatus for speech model with personalization via ambient context harvesting, is described herein. The apparatus includes a microphone, context harvesting module, confidence module, and training module. The context harvesting module is to determine a context associated with the captured audio signals. A confidence module is to determine a confidence of the context as applied to the audio signals. A training module is to train a neural network in response to the confidence being above a predetermined threshold.

20 Claims, 5 Drawing Sheets

(51) Int. Cl.
*G10L 15/07* (2013.01)
*G10L 15/16* (2006.01)
*G10L 15/183* (2013.01)

(52) U.S. Cl.
CPC ............ *G10L 15/16* (2013.01); *G10L 15/183* (2013.01); *G10L 2015/0631* (2013.01); *G10L 2015/0633* (2013.01); *G10L 2015/0635* (2013.01); *G10L 2015/0636* (2013.01); *G10L 2015/0638* (2013.01)

(58) Field of Classification Search
CPC ..... G10L 2015/0635; G10L 2015/0633; G10L 2015/0631; G10L 15/065; G10L 15/07; G10L 15/075
See application file for complete search history.

(56) References Cited

U.S. PATENT DOCUMENTS 7,263,489 B2* 8/2007 Cohen .................. H04M 3/493 704/270.1
9,153,231 B1* 10/2015 Salvador .............. G10L 15/065
9,401,140 B1* 7/2016 Weber .................... G10L 15/07
9,495,955 B1* 11/2016 Weber .................. G10L 15/063
9,607,612 B2 3/2017 Deleeuw
9,697,822 B1* 7/2017 Naik ...................... G10L 15/22
9,710,461 B2 7/2017 Smith et al.
9,772,994 B2 9/2017 Karov et al.
9,837,069 B2 12/2017 Shamir et al.
10,127,224 B2 11/2018 Deleeuw
10,217,458 B2 2/2019 Mangalath et al.
10,255,909 B2 4/2019 Hofer et al.
10,339,935 B2 7/2019 Cilingir et al.
10,424,299 B2 9/2019 Lawrence et al.
10,540,975 B2 1/2020 Begum et al.
11,776,530 B2* 10/2023 Amores .................. G10L 15/07 704/232
2002/0087314 A1* 7/2002 Fischer .................. G10L 15/07 704/255
2002/0123891 A1 9/2002 Epstein
2003/0036903 A1* 2/2003 Konopka .............. G10L 15/065 704/E15.009
2011/0295590 A1* 12/2011 Lloyd ..................... G10L 15/22 704/8
2012/0130716 A1* 5/2012 Kim ........................ G10L 15/20 901/50
2012/0142378 A1 6/2012 Kim et al.
2014/0324428 A1* 10/2014 Farraro ................... G10L 15/06 704/231
2014/0324434 A1 10/2014 Vozila et al.
2014/0379346 A1* 12/2014 Aleksic ................ G06V 30/274 704/251
2015/0066502 A1* 3/2015 Achituv .................. G10L 15/01 704/235
2015/0179168 A1* 6/2015 Hakkani-Tur .......... G10L 15/22 704/257
2015/0279353 A1* 10/2015 Itoh ........................ G10L 15/18 704/243
2015/0294665 A1 10/2015 Itoh et al.
2015/0317974 A1* 11/2015 Bangalore ............. G10L 13/033 704/243
2015/0348548 A1 12/2015 Piernot et al.
2015/0364139 A1* 12/2015 Dimitriadis ............ G06V 20/10 704/231
2015/0379983 A1* 12/2015 Siohan .................. G10L 15/063 704/244
2016/0104486 A1* 4/2016 Penilla .................... G10L 25/45 704/232
2016/0196820 A1* 7/2016 Williams ............ G10L 15/1822 704/244
2016/0267903 A1* 9/2016 Kapralova .............. G10L 15/30
2017/0025118 A1 1/2017 Itoh et al.
2017/0169815 A1* 6/2017 Zhan ....................... G10L 15/14
2017/0177716 A1 6/2017 Perez et al.
2017/0200447 A1 7/2017 Vozila et al.
2017/0270929 A1* 9/2017 Aleksic ................... G10L 15/22
2018/0247646 A1* 8/2018 Meacham ............... G10L 25/30
2018/0349354 A1 12/2018 Gonzalez et al.
2018/0349794 A1 12/2018 Georges et al.
2019/0051288 A1* 2/2019 Lee ....................... G10L 15/183
2019/0214021 A1 7/2019 Pearce
2020/0243069 A1* 7/2020 Amores .................. G10L 15/16
2024/0038218 A1* 2/2024 Amores ................ G10L 15/063

OTHER PUBLICATIONS

Long et al., "Research on a Self-Adaption Algorithm of Recurrent Neural Network Based Chinese Language Model," Fire Control & Command Control, vol. 41, No. 5, May 2016, 5 pages. [English Abstract Included].
Soan et al., "Some Recent Advances in Large Vocabulary Continuous Speech Recognition," IEEE Signal Processing Magazine, Nov. 2012, 36 pages.
International Searching Authority, "International Search Report," issued in connection with International Patent Application No. PCT/IB2017/057133, mailed on Jul. 25, 2018, 4 Pages.
International Searching Authority, "Written Opinion," issued in connection with International Patent Application No. PCT/IB2017/057133, mailed on Jul. 25, 2018, 7 Pages.
United States Patent and Trademark Office, "Notice of Allowance and Fee(s) Due," issued in connection with U.S. Appl. No. 16/650,161, mailed on May 12, 2023, 7 pages.
United States Patent and Trademark Office, "Non-Final Office Action, " issued in connection with U.S. Appl. No. 16/650,161, mailed on Mar. 11, 2022, 12 pages.
United States Patent and Trademark Office, "Final Office Action," issued in connection with U.S. Appl. No. 16/650,161, mailed on Sep. 21, 2022, 10 pages.
United States Patent and Trademark Office, "Advisory Action," issued in connection with U.S. Appl. No. 16/650,161, mailed on Feb. 3, 2023, 3 pages.
United States Patent and Trademark Office, "Notice of Allowance and Fee(s) Due," issued in connection with U.S. Appl. No. 16/650,161, mailed on Mar. 15, 2023, 8 pages.
International Searching Authority, "International Preliminary Report on Patentability," issued in connection with International Patent Application No. PCT/IB2017/057133, dated May 19, 2020, 8 Pages.
China National Intellectual Property Administration, "Office Action," issued in connection with Chinese Patent Application No. 201780095381.8, mailed on Aug. 14, 2024, 17 pages. [English Machine Translation Included].

* cited by examiner

100

200

300

SPEECH MODEL PERSONALIZATION VIA AMBIENT CONTEXT HARVESTING

RELATED APPLICATIONS

This patent arises from a continuation of U.S. patent application Ser. No. 16/650,161, now U.S. Pat. No. 11,776,530, which was filed on Mar. 24, 2020. U.S. patent application Ser. No. 16/650,161 arises from the national stage of International Patent Application No. PCT/IB2017/057133, which was filed on Nov. 15, 2017. U.S. patent application Ser. No. 16/650,161 and International Patent Application No. PCT/IB2017/057133 are hereby incorporated by reference in their entireties. Priority to U.S. patent application Ser. No. 16/650,161 and International Patent Application No. PCT/IB2017/057133 is hereby claimed.

BACKGROUND ART

Speech recognition systems rely on various speech models to translate spoken language into text. Speech recordings and transcripts of target users using spoken language interfaces can be used to improve the accuracy of speech recognition systems by training the speech models. A user may read a known script or text to train a model to recognize the user and fine tune recognition of the user's speech.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
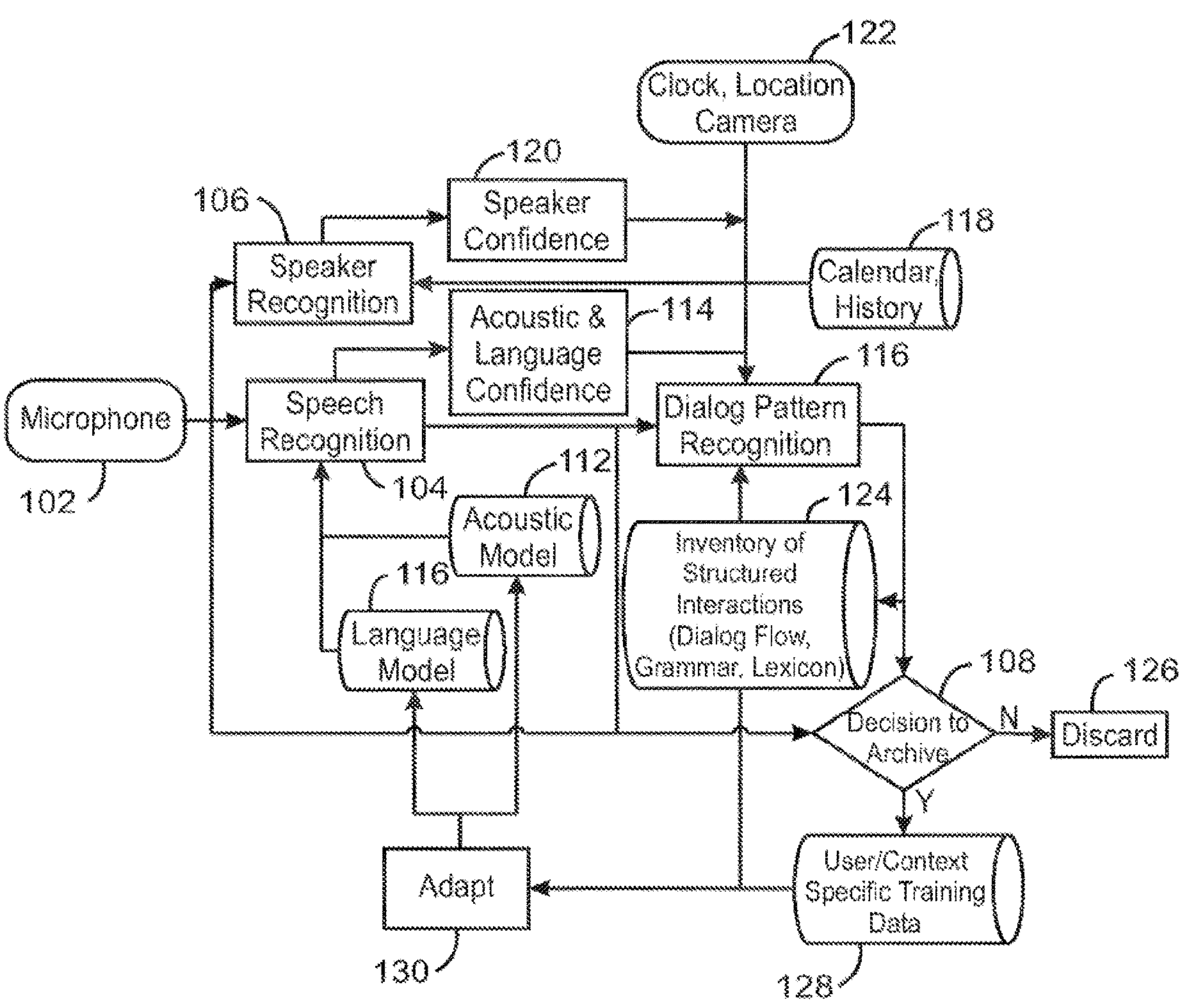
FIG. 1 is a diagram of a speech recognition model with personalization via ambient context harvesting.

Collection of reliable speech training data is often intrusive and time consuming. As discussed above, a user must often read a known script or text to train a model to recognize the user and fine tune recognition of the user's speech. Traditional systems typically prompt users to speak enrollment phrases that are time consuming and cumbersome to use. Such enrollment phrases and other training material used by traditional text recognition systems is not collected in target usage settings. Speech recognition systems that collect a user's utterances in a remote network such as a "cloud" compromise privacy of the user and are limited to cloud usages. For example, utterances stored in the cloud are typically limited to brief, short queries as the transmission of large amounts of utterances is often computationally and power intensive. Further, reliable transcripts are often hard to develop and obtain, as realistic acoustic scenarios can alter the text corresponding to the most straight forward transcripts.

Embodiments described herein speech model personalization via ambient context harvesting. As used herein, a context may refer to situational information that can affect the types of utterances that occur. Context may be based on, for example, linguistics, time, location, repetitive behaviors, or any combination thereof. In embodiments, an electronic device may be a worn device that listens for situations where there is high confidence that recognition is correct including structured interactions (such as game play, medical protocols, and the like) and high-frequency word patterns. A high frequency word pattern may be a word or plurality of words that appear often in a particular context. For example, when giving directions, the words "go right," "go left," and "turn here" may be spoken often. This high confidence speech is used to adapt an acoustic model stored on a worn electronic device to personalize speech recognition for increased accuracy. High confidence data may be data that is above a pre-determined threshold of confidence. The present techniques enable training speech models on-the-fly without any intrusion into a user's daily behaviors. Indeed, the present techniques may be used to train, re-train, and adapt a speaker dependent speech recognition system without using predetermined text read by the user. In some embodiments, speech from a plurality of speakers can be recognized using the techniques described herein.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

FIG. 1 is a diagram of a speech recognition model 100 with personalization via ambient context harvesting. Although the model is illustrated as having various stages, the training, retraining, and adaptation of the model can be executed by more than or less than the blocks illustrated. A microphone array 102 may be used to capture audio. The captured audio is transmitted to a speech recognition block 104, a speaker recognition block 106, and a decision to archive block 108. The speech recognition block 104 may be used to determine the text that corresponds to language in audio captured by the microphone array 102. The speaker recognition block 106 may be used to identify the particular speaker. The present techniques may be used to identify a plurality of speakers, and can be used to train a model to recognize speech from each identified user. The decision to archive block 108 may be configured to determine if a particular interaction should be stored as a new interaction as further described below.

A language model 110 and an acoustic model 112 and may provide data to the speech recognition block 104. In embodiments, language model 110 and the acoustic model 112 each may be implemented as a Hidden Markov Model (HMM) that enables speech recognition systems to rely on a combination of data including language, acoustics, and syntax elements. The language model 110 may enable a context to be used as a constraint in matching various sounds to word sequences by adapting the language model as more contexts are derived. In embodiments, the contexts may be harvested and used for training, re-training, and adaptation as described below. In embodiments, the language model 110 may provide a likelihood that a sequence of sounds belongs to a particular group of words. An acoustic model 112 may be used to identify a relationship between an audio signal and linguistic units of speech. In embodiments, the language model 110 and acoustic model 112 may be seeded with initial models based on typical interactions and adapted based on observed structured interactions. With information provided from the language model 110 and acoustic model 112, the speech recognition block 104 may output a stream of recognized text to a dialog pattern recognition 116.

The speaker recognition block 106 may be used to identify speakers from the audio captured by the microphone 102. Speaker recognition can be used to simplify the speech recognition at block 104. In embodiments, the speaker recognition block 106 can be used to determine a primary user as well as a plurality of speakers that interact with the user. In embodiments, the speaker recognition block 106 may be use data, such as behavioral data 118 to identify the user as well as other speakers. In embodiments, the behavioral data may be obtained from available data stores such as a calendar and history. For example, if a user has an appointment on a calendar with a particular person/speaker, the speaker recognition can use the appointment and any other previous appointments to apply a context to identify the particular person/speaker. Moreover, the language used by the user with the particular person/speaker may be repetitive or cumulative. The present techniques may be used to identify a context based on the user's behavior.

The speaker recognition block may output a plurality of identified speakers to a speaker confidence block 120. The speaker confidence may be determined based on may be determined using speaker recognition techniques. In embodiments, speaker confidence refers to the likelihood that the speaker identified by the speaker recognition algorithm at block 106 is the true speaker. In speaker recognition, the speaker score (perhaps normalized by anti-speaker or background models) may be compared to a threshold and make a binary decision. A confidence score may be derived based on the raw speaker, background, anti-speaker, etc., scores. Additionally, in embodiments, a Bayesian inference conditioning on other information like location, place, etc. may be used to determine a speaker confidence. The speaker confidence block may output a speaker likelihood given the above information.

A speaker confidence from block 120 along with clock, location and video/camera data from block 122 may be input to the dialog pattern recognition block 116. Additionally, as illustrated, the dialog pattern recognition block 116 may also take as input the recognized speech from block 104 and an inventory of structured interactions from block 124. The inventory of structured interactions may include, for example, dialog flow, grammar, lexicon, and the like. At block 116, the text as determined at block 104 may be analyzed with the speaker confidence from block 120, clock, location and camera at block 122, and acoustic and language confidence at block 114 to determine if a particular dialog pattern corresponds to a structured interaction. When a particular dialog pattern corresponds to a structured interaction, it may be stored at block 124 in an inventory of structured interactions. A dialog pattern may refer to a sequence of interactions. In some cases, the sequence of interactions may be in the form of intents and arguments such as a "greeting+give_direction(right)+quit". The dialog pattern may be derived by an automatic speech recognition (ASR) transcription plus an intent and argument identification component.

At block 108, a decision to archive the current pattern is made. If the current pattern is not archived, it is discarded at block 126. If the current pattern is archived, it is stored at block 128 as user/context specific training data. At block 128, a recognized pattern of interaction is created or updated based on grammar. The text sequence and intent sequence may be used to recognize the pattern of interaction. In embodiments, the output of block 128 may be a flowchart derived from the text/intent sequence. If the current dialog pattern is archived, a similarity metric is evaluated for each pattern in the archive, possibly implemented efficiently using hashes. This training data is used at block 130 to adapt the language model 110 and the acoustic model 112. Adaptation at block 130 includes, but is not limited to, providing data to adapt each of the language model and the acoustic model with model specific data obtained during a specific context. In particular, adaptation includes training a new statistical model with the new user-specific data obtained from block 128. Training the new statistical model may depend on the statistical techniques applied for obtaining the acoustic and language models.

In embodiments, acoustic models may be adapted by adjusting their parameters to account for new data, by augmenting with speaker specific parameters, or by creating new feature vector transforms that map feature vectors to a canonical acoustic space and the like. Language models may be adapted by adjusting n-gram frequencies to account for new data, by interpolating with new n-gram frequencies, adding new words to the lexicon, and the like.

Thus, on an initial pass through the model 100, the present techniques may establish an initial context including a user identity and any other associated speakers. As the microphone captures more data, the inventory of structured interactions may grow to include additional structured interactions based on a pattern of use by the user. The model may be an always on, always listening model. Traditional techniques focus on manual data collection with a large amount of human input involved in training the model. Typically, a few hundred hours of training data (audio) are used to train a speech recognition model. The present techniques introduce a model that can be trained within a variety of different contexts and is not limited to one predetermined text or pattern.

The proposed system relies on a database of structured interactions. Structured interactions are patterns of dialog flow that occur in everyday life. Examples include game play (with specific turn-taking structure, vocabulary, object relations, etc.), purchases, phone calls, social interactions, business transactions, etc. A microphone on a worn or ambient device is used to monitor audio, process it using a speech recognition engine to convert to text (with some degree of confidence), and process with a speaker recognition engine to identify talkers (with some degree of confidence). Text (or text lattices) from the speech recognition, speaker identity hypotheses from the speaker recognition engine, confidence measurements, along with other sensor input (time, location, object, etc.) and other relevant data stores (calendar, interaction history, etc.) are used to identify and characterize the current pattern of interaction. A text lattice may be the set of all possible interpretations of a user input as processed by the ASR, typically in the form of an Acyclic Directed Graph. A pattern of interaction may be, for example, a greeting followed by question/answer followed by payment, followed by salutation.

When a pattern of structured interaction is identified (e.g., user is at the grocery store in front of the cash register making a purchase), speech recognition may be re-run with grammar and lexicon that are specific to the pattern to determine if confidence is increased. If confidence increases, this helps to confirm that the correct pattern was identified. If a clear pattern is identified with high acoustic and language confidence but does not match one of the previously stored patterns, it may be stored as a new pattern. If speech recognition acoustic confidence, language confidence, and pattern confidence are high then the audio and its transcription is saved for future acoustic and language model adaptation or training. A confidence may be a number indicating the likelihood that a given decision is correct given all available data. In embodiments, the confidence may be a score that indicates that the given language, acoustics, or patterns are correct as determined with respect to a present context. Confidence computation may be performed using a Bayesian approach and conditioning on pertinent side information. In embodiments, the confidence scores may be determined based on the particular statistical technique used in the acoustic, language, and pattern confidences. For example, the scores may be obtained from a softmax in the last layer of a neural net.

Figure 2:
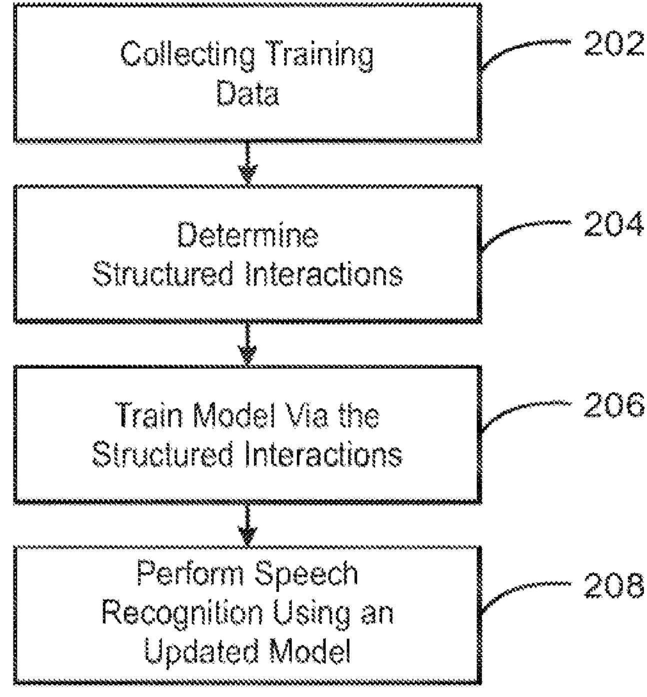
FIG. 2 is a process flow diagram of a method to enable a speech model with personalization via ambient context harvesting.

FIG. 2 is a process flow diagram of a method 200 to enable a speech model with personalization via ambient context harvesting. At block 202, training data is collected. In embodiments, training data is collected as audio, video, or any combination thereof. The audio and video data may be monitored by an always on listening device. At block 204, structured interactions are determined. For example, the monitored audio may be processed using a speech recognition engine to convert to text (with some degree of confidence). The text may also be processed by a speaker recognition engine to identify talkers (with some degree of confidence). The structured interactions may be determined based on confidence values and the recognition of a pattern in an identified dialogue.

At block 206, the model may be trained. In embodiments, the model is trained in an unsupervised fashion based on labeled, high confidence training data that corresponds to a recognized structured interaction. If the structured interaction is not recognized, the new structured interaction may be saved as a recognized structured interaction.

The model may be trained based on a current pattern and resulting structured interaction is identified from text. In embodiments, training comprises the modification of a neural network such that layers of the network can take as input the audio values and produce the text that was discovered during the structured interaction. In embodiments, training inputs are applied to the input layer of a neural network, and desired outputs are compared at the output layer. During a learning process, a forward pass is made through the neural network, and the output of each element is computed layer by layer. As the network is re-trained with additional audio and corresponding structured interactions, the accuracy of the model will improve.

At block 208, speech recognition is performed a second time using the retrained model. When a pattern of structured interaction is identified, speech recognition may be re-run with grammar and lexicon that are specific to the identified pattern to see if the confidence score has increased. In embodiments, if confidence increases, this helps to confirm that the correct pattern was identified. If a clear pattern is identified with high acoustic and language confidence but does not match one of the previously stored patterns, it may be stored as a new pattern. Additionally, if each of the acoustic confidence, language confidence, and pattern confidence are high then the audio and its transcription are saved for future acoustic and language model adaptation or training.

Figure 3:
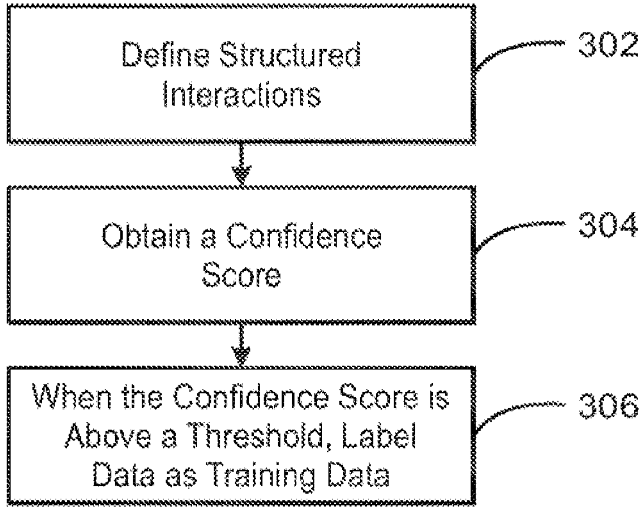
FIG. 3 is a process flow diagram of a method for identifying contexts on the fly.

FIG. 3 is a process flow diagram of a method 300 for identifying contexts on the fly. At block 302, structured interactions are defined. The structured interactions may be defined based on a pattern of use of a particular person. The pattern of use may include, but is not limited to, location data, status of the device, ambient noise, and the like. For example, if a user enters a location known to be a restaurant each day around noon, it may be determined that a structured interaction such as ordering a meal will take place. Such an interaction includes sub-components such as greetings, names of foods, prices, and the like. In such an example, if the structured interaction can locate a particular restaurant as the location of the structured interaction, a menu from the restaurant may be used as text that identifies some likely training data.

At block 302, a confidence score is obtained. The confidence score may indicate the likelihood that a portion of text belongs to a particular structured interaction. At block 304, when confidence is above a predetermined threshold the particular portion of text or data is labeled as training data. At block 306, when the confidence scores are above a predetermined threshold, the data corresponding to the structured interactions may be labeled as training data.

Figure 4:
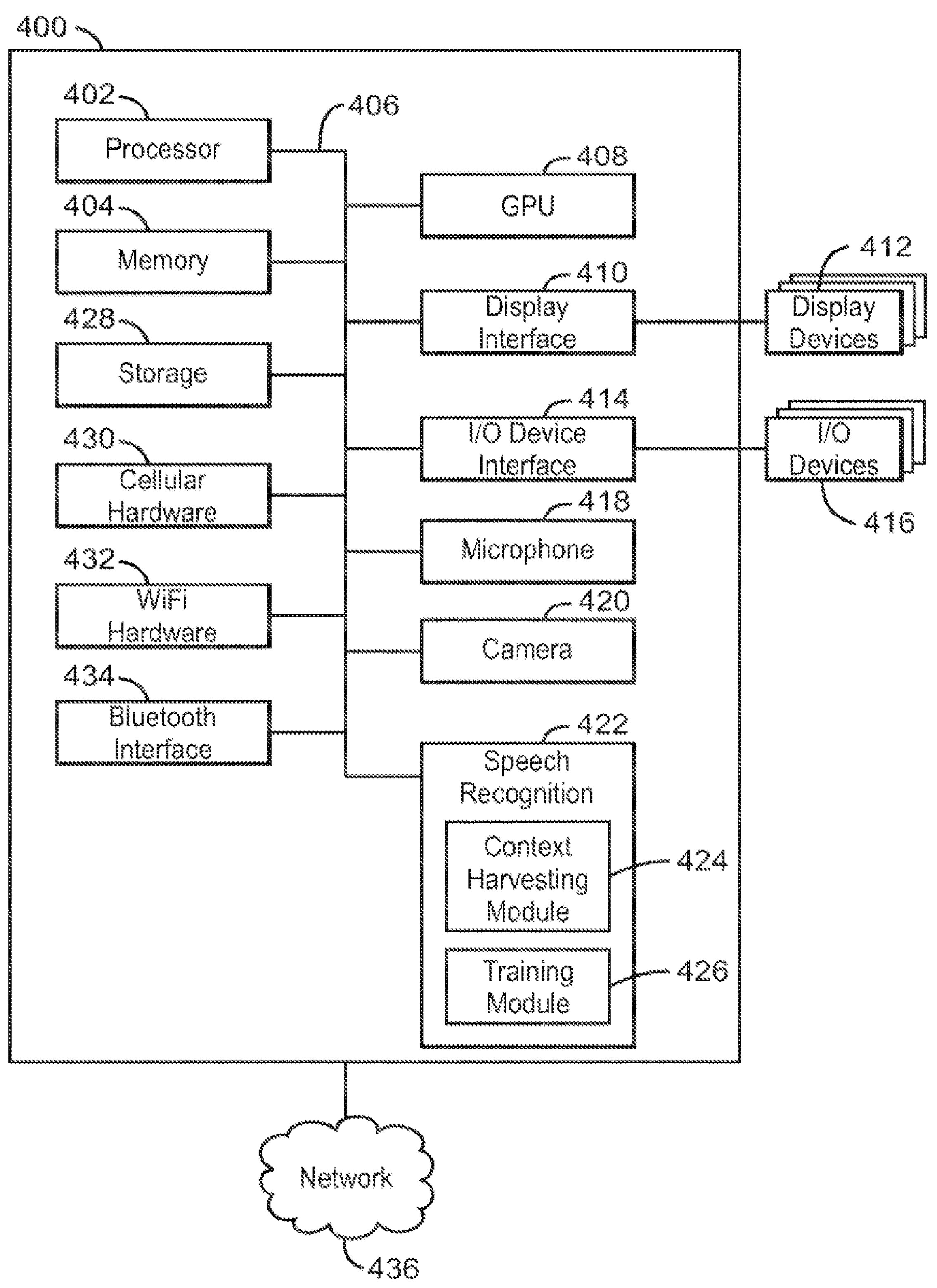
FIG. 4 is a block diagram of an electronic device that enables a speech model with personalization via ambient context harvesting.

FIG. 4 is a block diagram of an electronic device that enables a speech model with personalization via ambient context harvesting. The electronic device 400 may be, for example, a laptop computer, tablet computer, mobile phone, smart phone, or a wearable device, among others. The electronic device 400 may include a central processing unit (CPU) 402 that is configured to execute stored instructions, as well as a memory device 404 that stores instructions that are executable by the CPU 402. The CPU may be coupled to the memory device 404 by a bus 406. Additionally, the CPU 402 can be a single core processor, a multi-core processor, a computing cluster, or any number of other configurations. Furthermore, the electronic device 400 may include more than one CPU 402. The memory device 404 can include random access memory (RAM), read only memory (ROM), flash memory, or any other suitable memory systems. For example, the memory device 404 may include dynamic random-access memory (DRAM).

The electronic device 400 also includes a graphics processing unit (GPU) 408. As shown, the CPU 402 can be coupled through the bus 406 to the GPU 408. The GPU 408 can be configured to perform any number of graphics operations within the electronic device 400. For example, the GPU 408 can be configured to render or manipulate graphics images, graphics frames, videos, or the like, to be displayed to a user of the electronic device 400. In some embodiments, the GPU 408 includes a number of graphics engines, wherein each graphics engine is configured to perform specific graphics tasks, or to execute specific types of workloads.

The CPU 402 can be linked through the bus 406 to a display interface 410 configured to connect the electronic device 400 to a display device 412. The display device 412 can include a display screen that is a built-in component of the electronic device 400. The display device 412 can also include a computer monitor, television, or projector, among others, that is externally connected to the electronic device 400.

The CPU 402 can also be connected through the bus 406 to an input/output (I/O) device interface 414 configured to connect the electronic device 400 to one or more I/O devices 416. The I/O devices 416 can include, for example, a keyboard and a pointing device, wherein the pointing device can include a touchpad or a touchscreen, among others. The I/O devices 416 can be built-in components of the electronic device 400, or can be devices that are externally connected to the electronic device 400.

The electronic device also includes a microphone array 418. The microphone array 418 may have any number of microphones. The microphone array 418 can be used to capture audio to be input into a speech recognition model. Similarly, a camera 420 may be used to capture video and image data that can be used for ambient context harvesting as described above. A speech recognition module 422 may be used to recognize speech in each of a speaker dependent and a speaker independent fashion. A context harvesting module 424 may determine various contexts in which speech occurs by analyzing audio and using other information to determine a dialogue pattern that may be a component of a particular structured interaction. A training module 426 may use the audio data with a structured interaction derived from the audio data to train a neural network that is to realize the speech recognition functionality.

The electronic device may also include a storage device 428. The storage device 428 is a physical memory such as a hard drive, an optical drive, a flash drive, an array of drives, or any combinations thereof. The storage device 428 can store user data, such as audio files, video files, audio/video files, and picture files, among others. The storage device 428 can also store programming code such as device drivers, software applications, operating systems, and the like. The programming code stored to the storage device 428 may be executed by the CPU 402, GPU 408, or any other processors that may be included in the electronic device 400.

The CPU 402 may be linked through the bus 406 to cellular hardware 430. The cellular hardware 430 may be any cellular technology, for example, the 4G standard (International Mobile Telecommunications-Advanced (IMT-Advanced) Standard promulgated by the International Telecommunications Union—Radio communication Sector (ITU-R)). In this manner, the electronic device 400 may access any network 436 without being tethered or paired to another device, where the network 436 is a cellular network.

The CPU 402 may also be linked through the bus 406 to WiFi hardware 432. The WiFi hardware is hardware according to WiFi standards (standards promulgated as Institute of Electrical and Electronics Engineers' (IEEE) 802.11 standards). The WiFi hardware 432 enables the electronic device 400 to connect to the Internet using the Transmission Control Protocol and the Internet Protocol (TCP/IP), where the network 436 is the Internet. Accordingly, the electronic device 400 can enable end-to-end connectivity with the Internet by addressing, routing, transmitting, and receiving data according to the TCP/IP protocol without the use of another device. Additionally, a Bluetooth Interface 434 may be coupled to the CPU 402 through the bus 406. The Bluetooth Interface 434 is an interface according to Bluetooth networks (based on the Bluetooth standard promulgated by the Bluetooth Special Interest Group). The Bluetooth Interface 434 enables the electronic device 400 to be paired with other Bluetooth enabled devices through a personal area network (PAN). Accordingly, the network 436 may be a PAN. Examples of Bluetooth enabled devices include a laptop computer, desktop computer, ultrabook, tablet computer, mobile device, or server, among others. While one network is illustrated, the electronic device 400 can connect with a plurality of networks simultaneously.

The block diagram of FIG. 4 is not intended to indicate that the electronic device 400 is to include all of the components shown in FIG. 4. Rather, the computing system 400 can include fewer or additional components not illustrated in FIG. 4 (e.g., sensors, power management integrated circuits, additional network interfaces, etc.). The electronic device 400 may include any number of additional components not shown in FIG. 4, depending on the details of the specific implementation. Furthermore, any of the functionalities of the CPU 402 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 5:
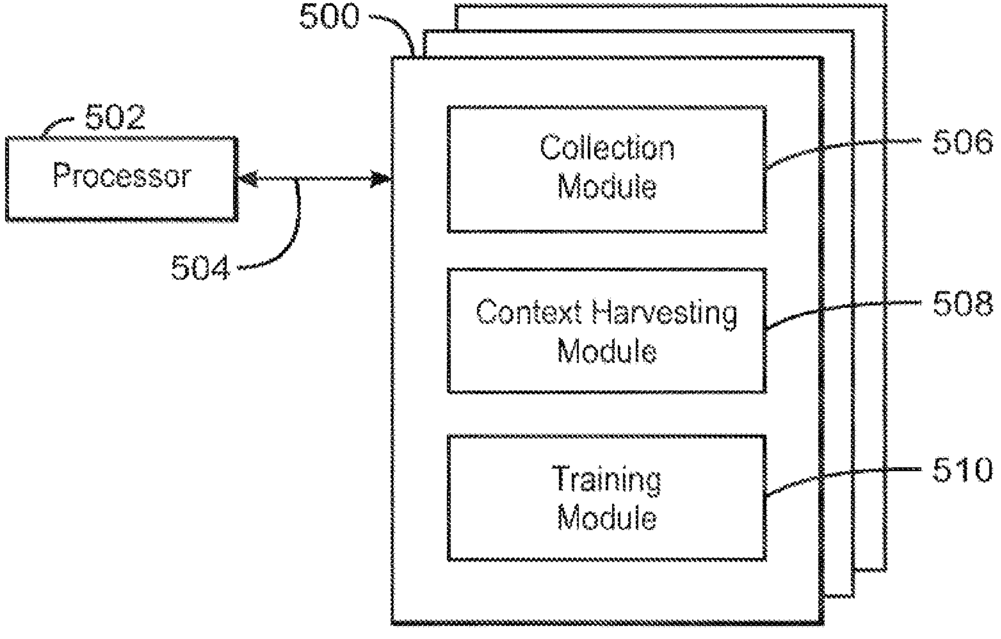
FIG. 5 is a block diagram showing a medium that contains logic for speech model with personalization via ambient context harvesting.

FIG. 5 is a block diagram showing a medium 500 that contains logic for speech model with personalization via ambient context harvesting. The medium 500 may be a computer-readable medium, including a non-transitory medium that stores code that can be accessed by a processor 502 over a computer bus 504. For example, the computer-readable medium 500 can be volatile or non-volatile data storage device. The medium 500 can also be a logic unit, such as an Application Specific Integrated Circuit (ASIC), a Field Programmable Gate Array (FPGA), or an arrangement of logic gates implemented in one or more integrated circuits, for example.

The medium 500 may include modules 506-510 configured to perform the techniques described herein. For example, a collection module 506 may be configured to collect data to use as inputs to train a neural network for speech recognition. In embodiments, the data includes audio data. The data may also include behavioral data such as calendar information, history, location information, and the like. A context harvesting module 508 may be configured to derive a context from the collected information. The context may be determined based on dialogue patterns and structured interactions. A training module 510 may be configured to train the neural network based on the harvested context and the collected data. In some embodiments, the modules 506-510 may be modules of computer code configured to direct the operations of the processor 502.

The block diagram of FIG. 5 is not intended to indicate that the medium 500 is to include all of the components shown in FIG. 5. Further, the medium 500 may include any number of additional components not shown in FIG. 5, depending on the details of the specific implementation.

Example 1 is an apparatus for speech model with personalization via ambient context harvesting. The apparatus includes a microphone to capture audio signals; a context harvesting module to determine a context associated with the captured audio signals; a confidence module to determine a confidence score of the context as applied to the audio signals; a training module to train a neural network in response to the confidence being above a predetermined threshold.

Example 2 includes the apparatus of example 1, including or excluding optional features. In this example, the context is determined by deriving a structured interaction based on a dialogue pattern within the audio signals.

Example 3 includes the apparatus of any one of examples 1 to 2, including or excluding optional features. In this example, the context is based on, at least in part, behavioral data.

Example 4 includes the apparatus of any one of examples 1 to 3, including or excluding optional features. In this example, the confidence comprises a language confidence.

Example 5 includes the apparatus of any one of examples 1 to 4, including or excluding optional features. In this example, the confidence comprises an acoustic confidence.

Example 6 includes the apparatus of any one of examples 1 to 5, including or excluding optional features. In this example, the confidence comprises a pattern confidence.

Example 7 includes the apparatus of any one of examples 1 to 6, including or excluding optional features. In this example, the context is determined by deriving a structured interaction based on a dialogue pattern within the audio signals, and in response to the structured interaction being a new structured interaction, the structured interaction is stored in a database.

Example 8 includes the apparatus of any one of examples 1 to 7, including or excluding optional features. In this example, apparatus of example 1, in response to the confidence being above the predetermined threshold, adapting a language model and an acoustic model using the context and the audio signals.

Example 9 includes the apparatus of any one of examples 1 to 8, including or excluding optional features. In this example, the context is determined by deriving a structured interaction based on a dialogue pattern within the audio signals, and a stored structured interaction is expanded in response to an additional recognized portion of the structured interaction.

Example 10 includes the apparatus of any one of examples 1 to 9, including or excluding optional features. In this example, the training module iteratively trains and adapts the neural network based on additional contexts and associated audio data.

Example 11 is a system for speech model with personalization via ambient context harvesting. The system includes a microphone to capture audio signals; a memory that is to store instructions and that is communicatively coupled to the microphone; and a processor communicatively coupled to the camera and the memory, wherein when the processor is to execute the instructions, the processor is to: determine a context associated with the captured audio signals; determine a confidence score of the context as applied to the audio signals; train a neural network in response to the confidence being above a predetermined threshold.

Example 12 includes the system of example 11, including or excluding optional features. In this example, the context is determined by deriving a structured interaction based on a dialogue pattern within the audio signals.

Example 13 includes the system of any one of examples 11 to 12, including or excluding optional features. In this example, the context is based on, at least in part, behavioral data.

Example 14 includes the system of any one of examples 11 to 13, including or excluding optional features. In this example, the confidence comprises a language confidence.

Example 15 includes the system of any one of examples 11 to 14, including or excluding optional features. In this example, the confidence comprises an acoustic confidence.

Example 16 includes the system of any one of examples 11 to 15, including or excluding optional features. In this example, the confidence comprises a pattern confidence.

Example 17 includes the system of any one of examples 11 to 16, including or excluding optional features. In this example, the context is determined by deriving a structured interaction based on a dialogue pattern within the audio signals, and in response to the structured interaction being a new structured interaction, the structured interaction is stored in a database.

Example 18 includes the system of any one of examples 11 to 17, including or excluding optional features. In this example, system of example 11, in response to the confidence being above the predetermined threshold, adapting a language model and an acoustic model using the context and the audio signals.

Example 19 includes the system of any one of examples 11 to 18, including or excluding optional features. In this example, the context is determined by deriving a structured interaction based on a dialogue pattern within the audio signals, and a stored structured interaction is expanded in response to an additional recognized portion of the structured interaction.

Example 20 includes the system of any one of examples 11 to 19, including or excluding optional features. In this example, the training module iteratively trains and adapts the neural network based on additional contexts and associated audio data.

Example 21 is a method. The method includes capturing audio signals; determining a context associated with the captured audio signals; determining a confidence score of the context as applied to the audio signals; and training a neural network in response to the confidence being above a predetermined threshold.

Example 22 includes the method of example 21, including or excluding optional features. In this example, the context is determined by deriving a structured interaction based on a dialogue pattern within the audio signals.

Example 23 includes the method of any one of examples 21 to 22, including or excluding optional features. In this example, the context is based on, at least in part, behavioral data.

Example 24 includes the method of any one of examples 21 to 23, including or excluding optional features. In this example, the confidence comprises a language confidence.

Example 25 includes the method of any one of examples 21 to 24, including or excluding optional features. In this example, the confidence comprises an acoustic confidence.

Example 26 includes the method of any one of examples 21 to 25, including or excluding optional features. In this example, the confidence comprises a pattern confidence.

Example 27 includes the method of any one of examples 21 to 26, including or excluding optional features. In this example, the context is determined by deriving a structured interaction based on a dialogue pattern within the audio signals, and in response to the structured interaction being a new structured interaction, the structured interaction is stored in a database.

Example 28 includes the method of any one of examples 21 to 27, including or excluding optional features. In this example, method of example 21, in response to the confidence being above the predetermined threshold, adapting a language model and an acoustic model using the context and the audio signals.

Example 29 includes the method of any one of examples 21 to 28, including or excluding optional features. In this example, the context is determined by deriving a structured interaction based on a dialogue pattern within the audio signals, and a stored structured interaction is expanded in response to an additional recognized portion of the structured interaction.

Example 30 includes the method of any one of examples 21 to 29, including or excluding optional features. In this example, the training module iteratively trains and adapts the neural network based on additional contexts and associated audio data.

Example 31 is at least one non-transitory machine readable medium having instructions stored therein that. The computer-readable medium includes instructions that direct the processor to capture audio signals; determine a context associated with the captured audio signals; determine a confidence score of the context as applied to the audio signals; and train a neural network in response to the confidence being above a predetermined threshold.

Example 32 includes the computer-readable medium of example 31, including or excluding optional features. In this example, the context is determined by deriving a structured interaction based on a dialogue pattern within the audio signals.

Example 33 includes the computer-readable medium of any one of examples 31 to 32, including or excluding optional features. In this example, the context is based on, at least in part, behavioral data.

Example 34 includes the computer-readable medium of any one of examples 31 to 33, including or excluding optional features. In this example, the confidence comprises a language confidence.

Example 35 includes the computer-readable medium of any one of examples 31 to 34, including or excluding optional features. In this example, the confidence comprises an acoustic confidence.

Example 36 includes the computer-readable medium of any one of examples 31 to 35, including or excluding optional features. In this example, the confidence comprises a pattern confidence.

Example 37 includes the computer-readable medium of any one of examples 31 to 36, including or excluding optional features. In this example, the context is determined by deriving a structured interaction based on a dialogue pattern within the audio signals, and in response to the structured interaction being a new structured interaction, the structured interaction is stored in a database.

Example 38 includes the computer-readable medium of any one of examples 31 to 37, including or excluding optional features. In this example, machine readable medium of example 31, in response to the confidence being above the predetermined threshold, adapting a language model and an acoustic model using the context and the audio signals.

Example 39 includes the computer-readable medium of any one of examples 31 to 38, including or excluding optional features. In this example, the context is determined by deriving a structured interaction based on a dialogue pattern within the audio signals, and a stored structured interaction is expanded in response to an additional recognized portion of the structured interaction.

Example 40 includes the computer-readable medium of any one of examples 31 to 39, including or excluding optional features. In this example, the training module iteratively trains and adapts the neural network based on additional contexts and associated audio data.

Example 41 is an apparatus for speech model with personalization via ambient context harvesting. The apparatus includes instructions that direct the processor to a microphone to capture audio signals; a means to determine a context associated with the captured audio signals; a means to determine a confidence score of the context as applied to the audio signals; and a means to train a neural network in response to the confidence being above a predetermined threshold.

Example 42 includes the apparatus of example 41, including or excluding optional features. In this example, the context is determined by deriving a structured interaction based on a dialogue pattern within the audio signals.

Example 43 includes the apparatus of any one of examples 41 to 42, including or excluding optional features. In this example, the context is based on, at least in part, behavioral data.

Example 44 includes the apparatus of any one of examples 41 to 43, including or excluding optional features. In this example, the confidence comprises a language confidence.

Example 45 includes the apparatus of any one of examples 41 to 44, including or excluding optional features. In this example, the confidence comprises an acoustic confidence.

Example 46 includes the apparatus of any one of examples 41 to 45, including or excluding optional features. In this example, the confidence comprises a pattern confidence.

Example 47 includes the apparatus of any one of examples 41 to 46, including or excluding optional features. In this example, the context is determined by deriving a structured interaction based on a dialogue pattern within the audio signals, and in response to the structured interaction being a new structured interaction, the structured interaction is stored in a database.

Example 48 includes the apparatus of any one of examples 41 to 47, including or excluding optional features. In this example, apparatus of example 41, in response to the confidence being above the predetermined threshold, adapting a language model and an acoustic model using the context and the audio signals.

Example 49 includes the apparatus of any one of examples 41 to 48, including or excluding optional features. In this example, the context is determined by deriving a structured interaction based on a dialogue pattern within the audio signals, and a stored structured interaction is expanded in response to an additional recognized portion of the structured interaction.

Example 50 includes the apparatus of any one of examples 41 to 49, including or excluding optional features. In this example, the training module iteratively trains and adapts the neural network based on additional contexts and associated audio data.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
- a microphone to capture audio;
- interface circuitry;
- machine readable instructions stored in a non-transitory memory; and
- programmable circuitry to at least one of execute or instantiate the machine readable instructions to:
  - detect speech based on the audio collected by the microphone;
  - identify situational data associated with the audio;
  - determine a context associated with the audio based on the situational data;
  - determine a confidence score indicative of a likelihood that the speech is associated with the context;
  - recognize a dialog pattern based on the speech and the situational data, including comparing the speech to reference dialog data, wherein the dialog pattern includes a sequence of interactions in the reference dialog data;
  - assign a similarity metric to the speech based on the comparison;
  - classify the speech based on the dialog pattern and the similarity metric; and
  - based on the confidence score satisfying a confidence threshold, add the speech and the similarity metric to a database.

2. The apparatus of claim 1, wherein the situational data includes one or more of a location or a time of day associated with collection of the audio.

3. The apparatus of claim 1, wherein the situational data includes the image data representative of an environment in which the audio was collected.

4. The apparatus of claim 1, wherein the situational data includes ambient noise in an environment in which the audio was collected.

5. The apparatus of claim 1, wherein the programmable circuitry is to:
- recognize a speaker associated with the speech; and
- identify the situational data based on the speaker.

6. The apparatus of claim 1, wherein the database is a database of structured interactions including reference dialog data, and wherein the programmable circuitry is to recognize the dialogue pattern based on a comparison of the speech to the reference dialog data.

7. The apparatus of claim 6, wherein the programmable circuitry is to identify the dialog pattern as a sequence of interactions in the reference dialog data.

8. The apparatus of claim 6, wherein the programmable circuitry is to assign a similarity metric to the speech based on the comparison.

9. The apparatus of claim 8, wherein the programmable circuitry is to include data associated with the classified speech and the similarity metric in training data to train a neural network for speech recognition.

10. At least one non-transitory memory comprising instructions to cause programmable circuitry to at least:
- detect speech from a user based on an audio collected by a microphone;
- identify a location associated with collection of the audio;
- determine a context associated with the audio based on the location;
- determine a confidence score indicative of a likelihood that the speech is associated with the context;
- recognize a structured interaction involving the user based on the speech and the location, including comparing the speech to reference dialog data, wherein the structured interaction includes a sequence of interactions in the reference dialog data;
- assign a similarity metric to the speech based on the comparison;
- classify the speech based on the structured interaction and the similarity metric; and
- add the speech and the similarity metric to a database, based on the confidence score satisfying a confidence threshold.

11. The at least one memory of claim 10, wherein the instructions cause the programmable circuitry to identify the location based on location data generated by a mobile device.

12. The at least one memory of claim 10, wherein the instructions cause the programmable circuitry to identify image data representative of an environment in which the audio was collected.

13. The at least one memory of claim 10, wherein the instructions cause the programmable circuitry to:
- identify the user associated with the speech; and
- recognize the structured interaction based on the identification of the user.

14. The at least one memory of claim 10, wherein the instructions cause the programmable circuitry to
- access textual data associated with the location, the textual data not associated with the speech; and
- generate training data to train a neural network, the training data including the classified speech and the textual data.

15. An apparatus comprising:
- a microphone to capture audio signals;
- interface circuitry;

machine readable instructions stored in a non-transitory memory; and programmable circuitry to at least one of execute or instantiate the machine readable instructions to:

identify a speaker associated with speech;

identify situational data associated with the speech;

determine a context associated with the audio based on the situational data;

determine a confidence score indicative of a likelihood that the speech is associated with the context;

recognize a dialog pattern based on the speech, the identity of the speaker, and the situational data, including comparing the speech to reference dialog data, wherein the dialog pattern includes a sequence of interactions in the reference dialog data; update training data based on the dialog pattern and the confidence score satisfying a confidence threshold, the training data to train a neural network model.

16. The apparatus of claim 15, wherein the speaker is a first speaker and the programmable circuitry is to:

recognize the dialogue pattern is an interaction between the first speaker and the second speaker; and associate at least one of the dialogue pattern or the speech with the interaction.

17. The apparatus of claim 15, wherein the situational data includes one or more of a location or a time of day associated with the collection of the speech.

18. The apparatus of claim 15, wherein the programmable circuitry is to identify the speaker based on the situational data.

19. The apparatus of claim 15, wherein the processor circuitry is to recognize the dialogue pattern based on a comparison of the speech to reference dialog data.

20. The apparatus of claim 19, wherein the reference dialog data is associated with the speaker.

* * * * *